(12) United States Patent  
Lavender et al.

(10) Patent No.: US 6,638,086 B2
(45) Date of Patent: Oct. 28, 2003

(54) CONFIGURABLE BATTERY CONNECTOR

(75) Inventors: Alan Howard Lavender, London (GB); Peter Jonathan Roberts, London (GB)

(73) Assignee: PAG Limited, London (GB)

(*) Notice: Subject to any disclaimer, the term of this patent is extended or adjusted under 35 U.S.C. 154(b) by 0 days.

(21) Appl. No.: 09/957,002

(22) Filed: Sep. 20, 2001

(65) Prior Publication Data

US 2002/0048981 A1 Apr. 25, 2002

(30) Foreign Application Priority Data

Sep. 20, 2000 (GB) .............................................. 0023066

(51) Int. Cl.⁷ ............................................ H01R 29/00
(52) U.S. Cl. .......................... 439/171; 439/218; 320/110
(58) Field of Search ................................ 439/171, 166, 439/342, 343, 345, 350, 246, 836, 32, 49, 151, 500, 172–175, 176, 224, 217, 218, 131, 136; 320/106, 110

(56) References Cited

U.S. PATENT DOCUMENTS

| | | | | |
|---|---|---|---|---|
| 5,007,848 A | * | 4/1991 | Lee | 439/101 |
| 5,038,093 A | * | 8/1991 | Edwards et al. | 320/2 |
| 5,135,406 A | * | 8/1992 | Ishikawa | 439/131 |
| 5,233,281 A | * | 8/1993 | Chiang et al. | 320/2 |
| 5,350,993 A | * | 9/1994 | Toya et al. | 320/2 |
| 5,602,454 A | * | 2/1997 | Arekawa et al. | 320/2 |
| 5,613,863 A | * | 3/1997 | Klaus et al. | 439/131 |
| 5,652,496 A | * | 7/1997 | Pilarzyk et al. | 320/2 |
| 5,656,914 A | | 8/1997 | Nagele et al. | 320/2 |
| 6,285,158 B1 | * | 9/2001 | Higuchi | 320/106 |
| 6,384,575 B1 | * | 5/2002 | Chen et al. | 320/110 |

FOREIGN PATENT DOCUMENTS

GB 2260040 A 3/1993 ............. H02J/7/00

* cited by examiner

*Primary Examiner*—P. Austin Bradley
*Assistant Examiner*—Phuong Chi Nguyen
(74) *Attorney, Agent, or Firm*—Thomas, Kayden, Horstemeyer & Risley, LLP

(57) ABSTRACT

A configurable battery connector (20) is provided for accommodating a plurality of different battery types (10). The connector (20) includes a plurality of slots (24, 26) for receiving enlarged headed connectors of a battery and two sets of electrical terminals (32, 34), each for a specific battery type. The electrical terminals (34) of one of the sets of terminals are provided on movable members (36, 38) which are coupled together to as to move from a first configuration in which these terminals (34) are active to a second configuration in which they are located behind a face plate (22) of the connector (20) and out of use, such that the terminals (32) of the other set of terminals are active. A latch keeps the connector (20) in one of its two configurations while a plurality of springs bias it to the other configuration when the latch is released. The connector allows different battery types to be attached to cameras, chargers and the like without the need for an adapter.

5 Claims, 5 Drawing Sheets

CONFIGURABLE BATTERY CONNECTOR

FIELD OF THE INVENTION

The present invention relates to a configurable battery connector, for example for a battery used in professional cameras.

BACKGROUND OF THE INVENTION

For ease of use, most cameras, particularly professional use cameras, are provided with removable rechargeable batteries. Thus, when on the move, a plurality of batteries can be carried for replacement when the charge of one battery becomes depleted and for recharging at a charging point.

There are various types of battery for such cameras and it is not uncommon that the cameraman may wish or have to use two or more different types of battery for the same camera. This may be because he/she wishes to take advantage of different characteristics of the batteries or because of availability. This has only been possible by providing an adapter between the camera fixings and the battery fixings. Not only does this mean that an additional component needs to be carried but this can also degrade the quality of the connection between the battery and camera, with consequent loss of performance.

SUMMARY OF THE PRESENT INVENTION

An object of the present invention is to provide a battery connector which can accommodate dissimilar batteries.

According to an aspect of the present invention, there is provided a configurable battery connector including at least one mechanical coupling for coupling a battery to the connector and at least one electrical terminal which can be coupled to a battery, the location or arrangement of the mechanical coupling or couplings and/or of the electrical terminal or terminals being configurable to be able to connect different configurations of battery to the connector.

In the preferred embodiment, there are provided two or more sets of electrical terminals, each set including at least one electrical terminal and being designed for an individual battery type, each set being activatable or configurable to accommodate its associated battery type.

Additionally or alternatively, the electrical terminals of each set may be movable with respect to the connector to a position in which they can contact one or more electrical terminals of an associated battery and preferably movable to a position in which they cannot contact the electrical terminals when a battery of different type is coupled to the connector.

In the preferred embodiment, the connector is provided with configuring means operable to reconfigure the connector automatically upon coupling of a battery to the connector.

DESCRIPTION OF THE DRAWINGS

An embodiment of the present invention is described below, with reference to the accompanying drawings, in which.

DESCRIPTION OF THE PREFERRED EMBODIMENT

Figure 1:
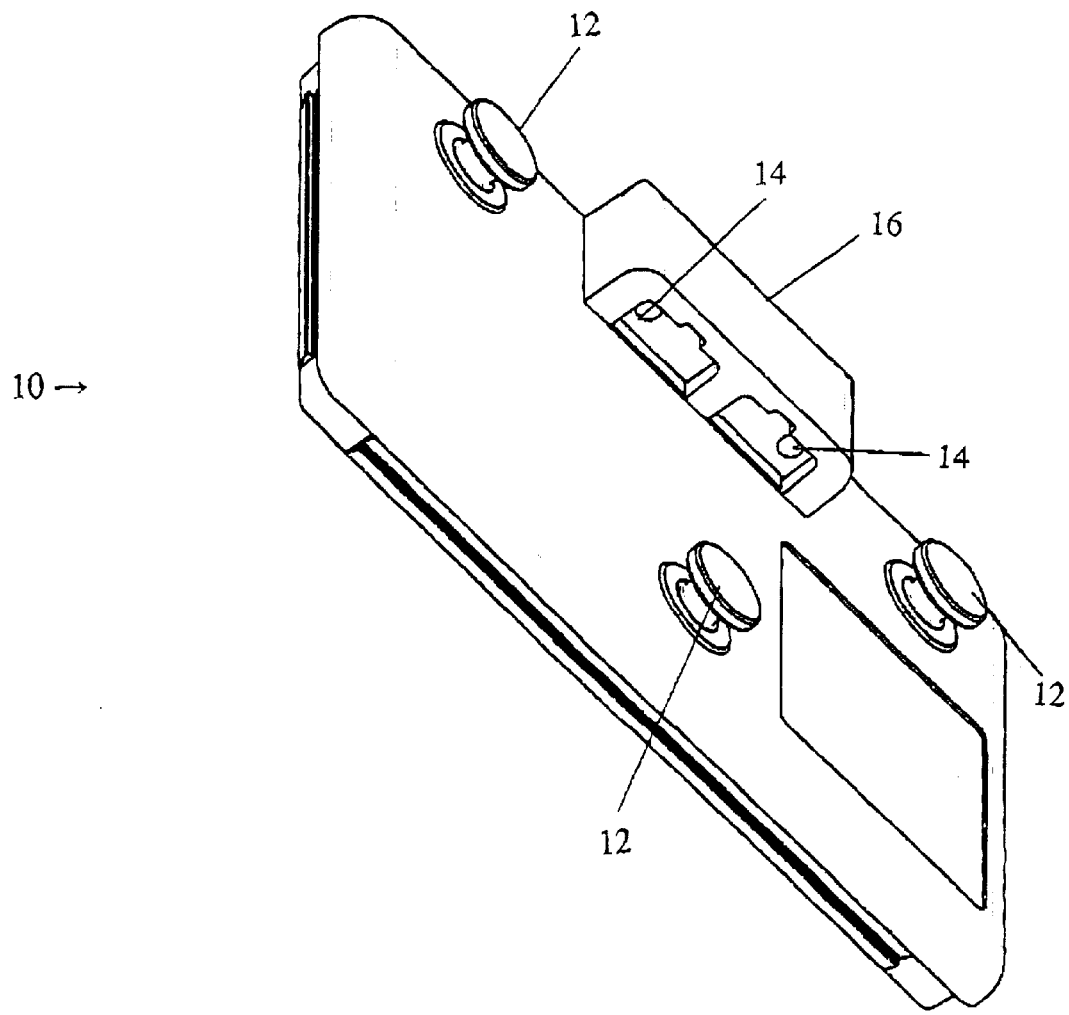
FIG. 1 is a perspective view of an example of battery connector plate carrying the mechanical and electrical connections of a battery.

Referring to FIG. 1, there is shown the connector plate 10 of an example of battery. The connector plate 10 typically forms one of the outer walls of the battery housing and includes, in this example, three mechanical connectors 12 and two electrical terminals 14. The mechanical connectors 12 are in the form of protruding bosses, to which are secured enlarged heads (not shown). The electrical terminals 14, which are coupled to the battery cells, are located in a protruding housing 16. They are in this example tubular in form to accommodate male terminals of equipment to which the battery is to be connected.

There may be provided additional electrical terminals, for certain logic functions of the type known in the art, although these are not shown for the sake of simplicity.

The battery is coupled to a camera, charger or other equipment by means of the connector plate 10. For this purpose, the camera, charger or other item is provided with a mating connector, in this example including two male electrical terminals which fit into the battery terminals 14 and three slots for receiving the connectors 12.

As explained above, different batteries tend to have different configurations of connector plate, with the result that it is often difficult or impossible to use different batteries on the same camera, charger or other item. For this purpose, it has been known to provide adapters which fit between a battery of different type and the camera, charger or other item.

FIGS. 2 to 5 show an embodiment of configurable connector 20 which can accommodate a plurality of different battery types (in this example two different types). The connector 20 is intended to be integral with a camera, charger or other item and in this respect can be either an integral part of the housing of such equipment or fixed thereto by any suitable means such as welding, riveting, bolting and the like.

The connector 20 includes a face plate 22 which is provided with two upper slots 24 at either side of the face plate 22 and a lower key hole recess 26 centrally located at a lower portion of the face plate 22. The slots 24 and key hole recess 26 are arranged to receive the bosses 12 with enlarged head (not shown) and are provided with lower portions 28 to 30 respectively through which the enlarged heads cannot pass so as to secure the battery to the configurable connector 20.

The connector 20 includes, in this example, two sets of electrical terminals 32 and 34 respectively. The sets of electrical terminals 32 and 34 are recessed relative to the face plate 22 such that face plate 22 presents a substantially smooth surface. The first set of electrical terminals 32 includes two elongate male terminals disposed substantially parallel to one another and spaced from one another by a spacing equivalent to the spacing between the electrical terminals 14 of the battery connector plate 10 shown in FIG. 1.

The second set of terminals (34) includes, in this embodiment, upper and lower terminals which are disposed substantially parallel to a vertical direction of the connector 20. The second set of terminals 34 is designed for a second battery type, as is explained in more detail below.

The connector 20 is provided with a first movable member 36 and a second movable member 38.

The first movable member 36 includes an upper wall 40 having two recesses 42 and an aperture 44 therein. The first movable member 36 is also provided with a movable support/actuator 46 which is fixed to the upper wall 40 so as to move therewith. The movable support/actuator 46 supports one of the terminals 34 of the second set of electrical terminals.

The second movable member 38 provides a movable side support 50 and its own movable support/actuator 52, which carries the second terminal 34 of the second set of electrical terminals.

Figure 2:
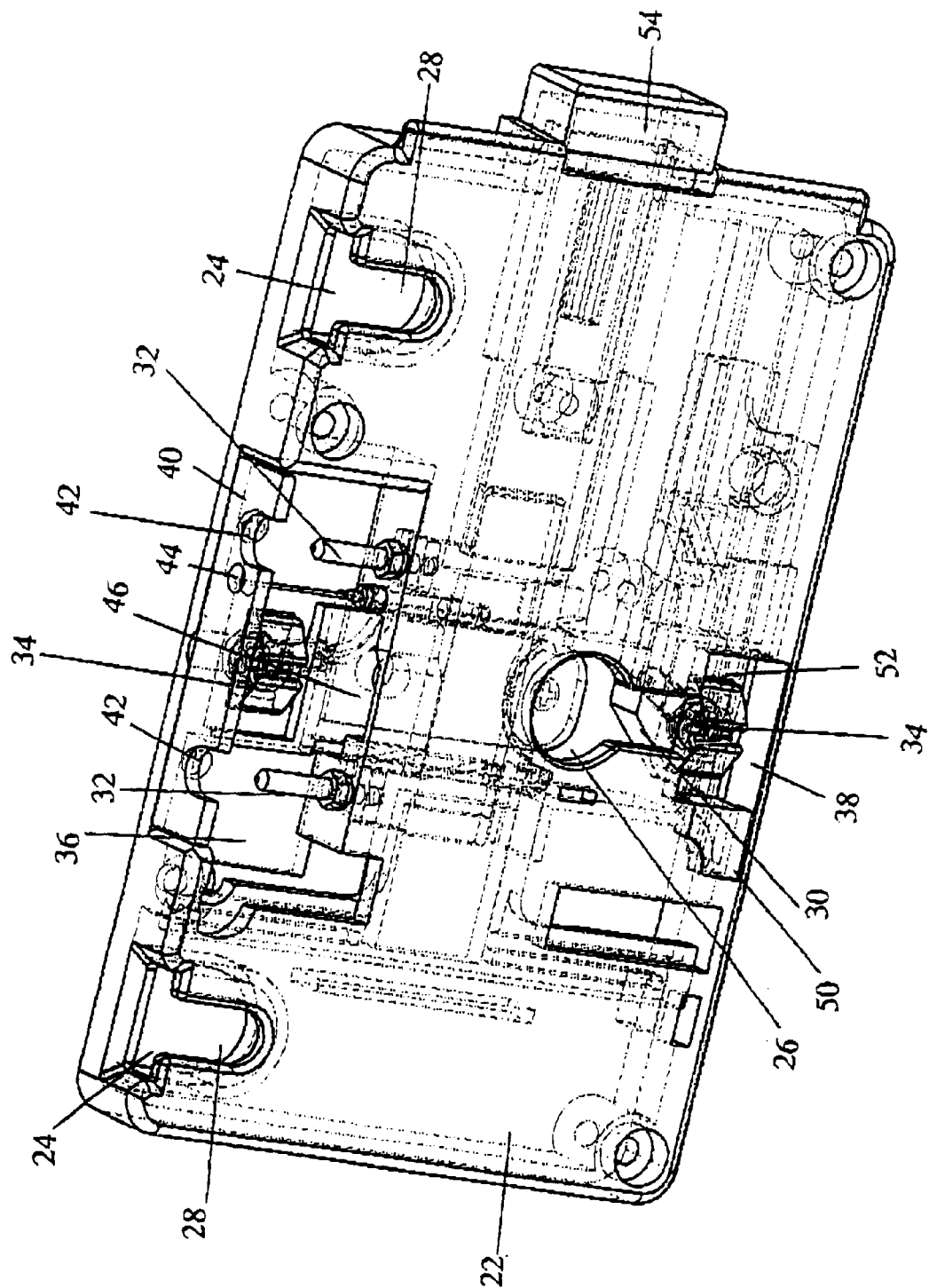
FIG. 2 is a front perspective view of a preferred embodiment of configurable connector in a first configuration.

A release button 54 is provided to release the connector 20 from its second configuration, described in detail below, so that it can regain its first configuration shown in FIG. 2.

Figure 3:
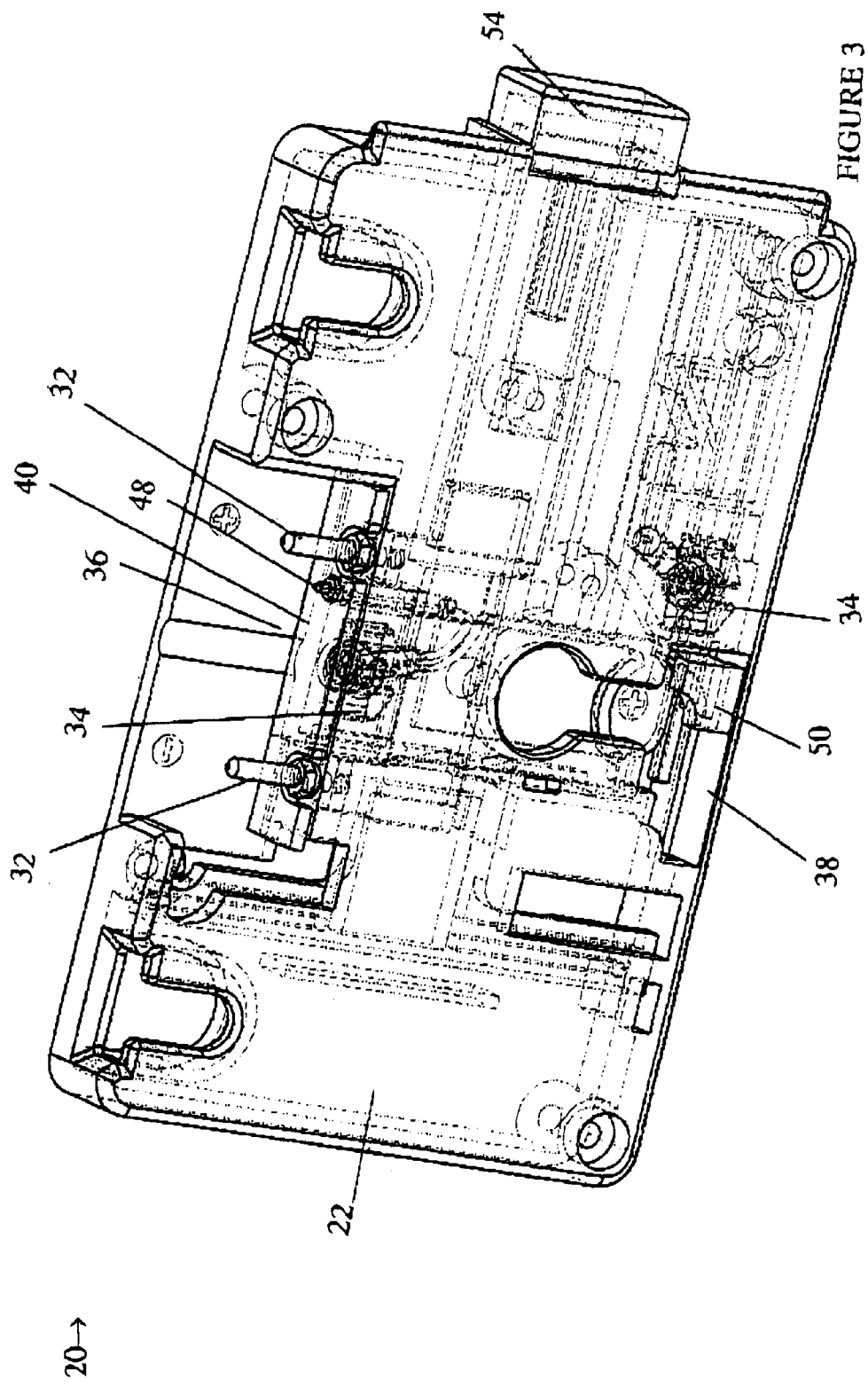
FIG. 3 is a front perspective view of the configurable connector of FIG. 2 in a second configuration.

Referring now to FIG. 3, the connector plate 20 can be seen in its second configuration. In this configuration, the movable members 36, 38 have been moved to a closed position in which the terminals 34 of the second set of terminals have been moved so as to be located behind the face plate 22. In this configuration also, the electrical terminals 32 of the first set of terminals are exposed through the recesses 42 of the upper wall 40 so that they can be used. The aperture 44 exposes a control terminal 48 which can be coupled to a control input/output on a battery (not shown).

When considering FIGS. 1 and 3 together, it will be apparent that the protruding housing 16 of the battery connector plate 10 will reside within the recess formed when the upper movable element 36 is in its lowermost, closed position. In practice, upon coupling of a battery to the connector 20, the battery would be moved from the top towards the bottom of the connector 20, such that the protruding housing 16 would itself push the upper wall 40 of the first movable member 36 downwards so that the changing of the configuration of the connector 20 is effected by simple movement of the battery when coupling it to the connector 20.

Once connector 20 reaches the configuration shown in FIG. 3, a latch (described below) keeps the connector 20 in the second configuration shown in FIG. 3. The release button 54 releases the latch so that the connector 20 can return to the first configuration shown in FIG. 2.

Referring again to FIG. 2, the terminals 34 of the second set of electrical terminals are exposed in this configuration such that a battery designed for these terminals can be coupled to these electrical terminals. Suitable mechanical connections on such a battery would engage the recesses 24, 26 and/or any other suitable coupling which can be provided in or on the face plate 22 of the connector 20.

Thus, the connector 20 can be configured to support two different types of battery, thereby avoiding the need for an adapter or the like.

Figure 4:
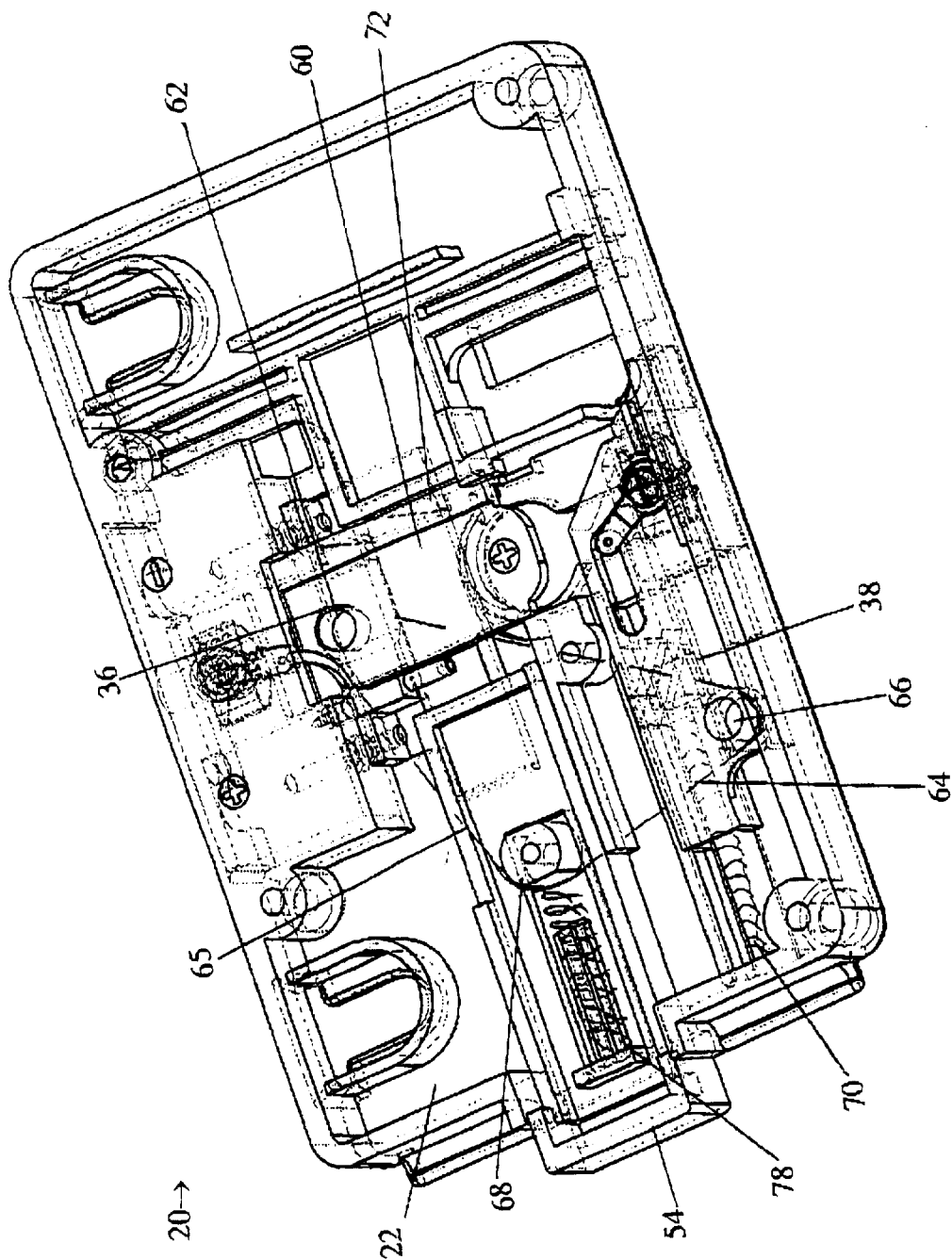
FIG. 4 is a rear perspective view of the configurable connector of FIG. 2 in the first configuration.
Figure 5:
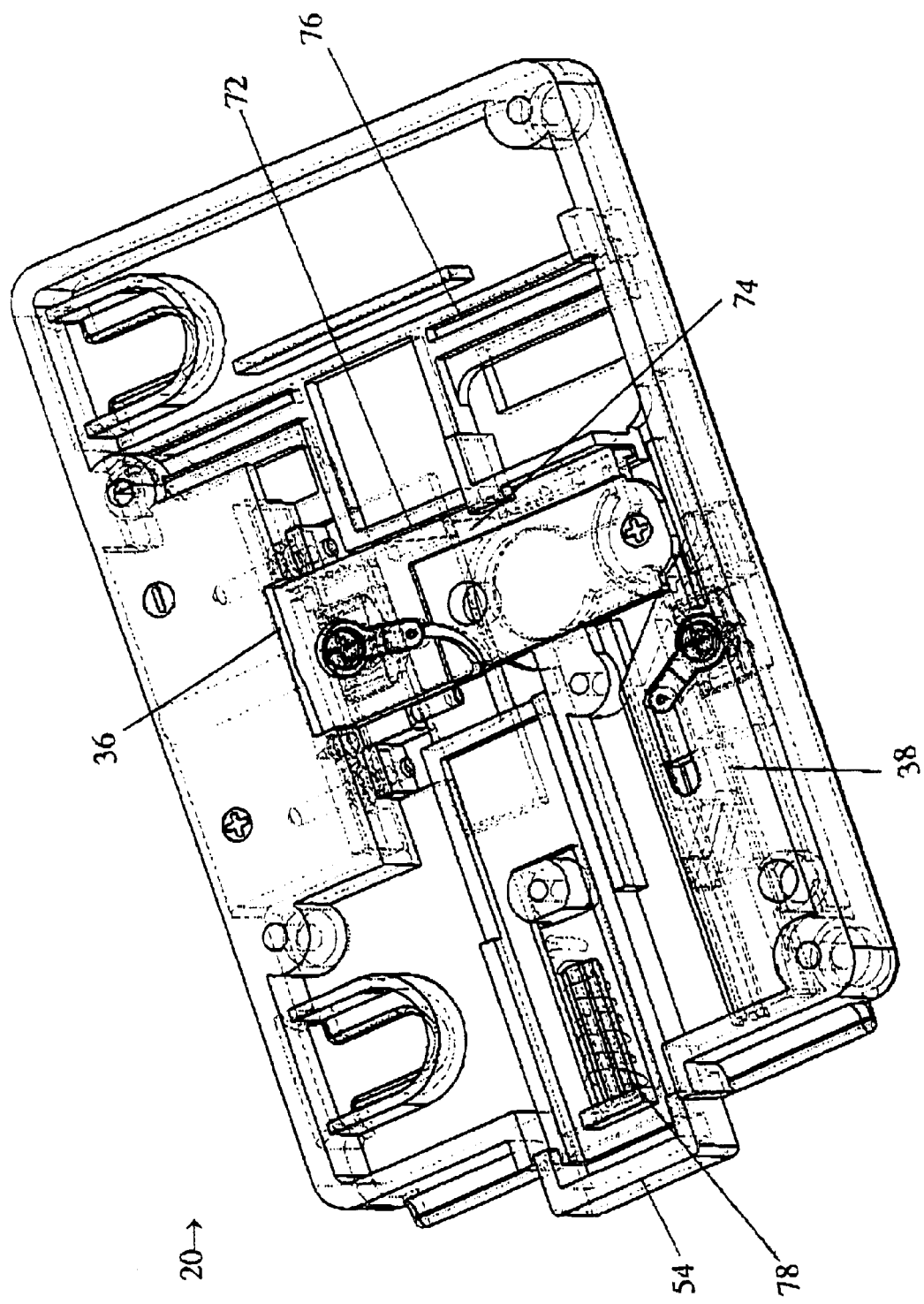
FIG. 5 is a rear perspective view of the configurable connector of FIG. 2 in the second configuration.

Reference is now made to FIGS. 4 and 5 which show in better detail the mechanism by which the connector 20 can be changed from its first configuration to its second configuration and vice versa.

Referring to FIG. 4, it can be seen that the first movable member 36 includes a rear wall 60 within which there is provided an aperture 62. Similarly, the second movable member 38 is provided with a rear wall 64 having therein an aperture 66. Secured to the back of the face plate 22 is provided a pivot point 68. Located above the pivot point 68 and apertures 62 and 66 is provided an actuator 65 of generally triangular form which includes one corner pivotally connected to the pivot point 8 and the second and third corners pivotally connected by shafts to the apertures 62 and 66.

The actuator 65 mechanically couples the first and second movable members together. More specifically, when the first movable member 36 is moved downwardly, this causes rotation of the actuator 65 about pivot point 68, which thereby causes the second movable member 38 to move also, in this embodiment in a direction substantially perpendicular to movement of the first member 36.

A coil spring 70 is provided between a wall of the connector 20 and the second movable member 38 to bias the second movable member to an open configuration and thereby to bias the first movable member 36 to an open configuration also, via the actuator 65. For this purpose, the connector 20 is provided with a latch 72 (shown in dotted outline) which provides a shoulder against which a triangular projection 74 of the first movable member 36 can abut. When this occurs, the first movable member 36 can no longer move out of the closed configuration until the latch 72 is released. For this purpose, the latch 72 is located on a latch plate 76 which is integral with the latch release button 54. A coil spring 78 biases the latch release button 54 in an outer position and the latch 72 into a latched position. Therefore, release of the latch 72 can only be effected by applying a depression force on the button 54 sufficient to overcome the force of the coil spring 78. In such an event, the coil spring 70 will act upon the second movable member 38 to urge this into its open configuration (to the right as shown in FIG. 4) and, by virtue of the actuator 65, first movable member 36 into its upper most position.

Thus, the connector 20 can be set to two different configurations to accommodate two different types of battery.

It will be apparent that different arrangements of mechanical connections and electrical terminals can be provided while still benefiting from the configurable nature of the connector as taught herein.

It will be apparent that modifications may be made to the disclosed embodiment within the scope of the appended claims.

We claim:

1. A configurable battery connector including at least one mechanical coupling designed to couple different battery types to the connector and at least two sets of electrical terminals connectable to electrical terminals of a battery, the mechanical coupling being reconfigurable to couple batteries which are mechanically dissimilar from one another to the connector, the electrical terminals being reconfigurable to be able to connect different configurations of battery terminals to the connector, each set of electrical terminals including at least one electrical terminal and being designed for an individual battery type, each set being configurable to accommodate its associated battery type, the connector being provided with a reconfiguring mechanism operable to reconfigure the connector automatically upon coupling of a battery to the connector, wherein the electrical terminals of one set are electrically isolated from an incompatible battery connected to the connector.

2. A connector according to claim 1, wherein the electrical terminals of one set are located in a different plane relative to the electrical terminals of another set.

3. A configurable battery connector including at least one mechanical coupling designed to couple different battery types to the connector and at least two sets of electrical terminals connectable to electrical terminals of a battery, the mechanical coupling being reconfigurable to couple batteries which are mechanically dissimilar from one another to the connector, the electrical terminals being reconfigurable to be able to connect different configurations of battery terminals to the connector, each set of electrical terminals including at least one electrical terminal and being designed for an individual battery type, each set being configurable to accommodate its associated battery type, the connector being provided with a reconfiguring mechanism operable to reconfigure the connector automatically upon coupling of a battery to the connector, wherein the electrical terminals of one set are electrically isolated from an incompatible battery connected to the connector and said electrical terminals are movable to a position in which they cannot contact the electrical terminals of an incompatible battery when such battery is coupled to the connector.

4. A connector according to claim 3, wherein the electrical terminals of one set are located in a different plane relative to the electrical terminals of another set.

5. A configurable battery connector including at least one mechanical coupling designed to couple different batteries having different configurations of connector plate to the connector and a plurality of electrical terminals connectable to electrical terminals of a battery, the mechanical coupling being reconfigurable to couple batteries which are mechanically dissimilar from one another to the connector, the electrical terminals being reconfigurable to be able to connect different configurations of battery terminals to the connector, wherein the connector is provided with a reconfiguring mechanism operable to reconfigure the connector automatically upon coupling of a battery to the connector.

* * * * *